United States Patent
Fan et al.

(10) Patent No.: US 8,445,553 B2
(45) Date of Patent: *May 21, 2013

(54) DEVULCANIZED RUBBER AND METHODS

(75) Inventors: Liang-tseng Fan, Manhattan, KS (US); Shahram Reza Shafie, Austin, TX (US)

(73) Assignee: Green Source Energy, LLC, Austin, TX (US)

( * ) Notice: Subject to any disclaimer, the term of this patent is extended or adjusted under 35 U.S.C. 154(b) by 267 days.

This patent is subject to a terminal disclaimer.

(21) Appl. No.: 12/797,347

(22) Filed: Jun. 9, 2010

(65) Prior Publication Data

US 2010/0249254 A1    Sep. 30, 2010

Related U.S. Application Data

(62) Division of application No. 11/636,611, filed on Dec. 11, 2006, now Pat. No. 7,767,722.

(51) Int. Cl.
*C08J 11/04*    (2006.01)

(52) U.S. Cl.
USPC .......................................... 521/41; 521/44.5

(58) Field of Classification Search
USPC .................................................. 521/41, 44.5
See application file for complete search history.

(56) References Cited

U.S. PATENT DOCUMENTS

| | | | |
|---|---|---|---|
| 1,843,388 A | 2/1932 | Taliaferro | |
| 1,959,576 A | 5/1934 | Taliaferro et al. | |
| 2,324,980 A | 7/1943 | Kilbourne, Jr. | |
| 4,104,205 A | 8/1978 | Novotny et al. | |
| 5,284,625 A | 2/1994 | Isayev et al. | |
| 5,362,759 A | 11/1994 | Hunt et al. | |
| 5,602,186 A | 2/1997 | Myers et al. | |
| 5,677,354 A | 10/1997 | Oliveira Da Cunha Lima | |
| 5,891,926 A | 4/1999 | Hunt et al. | |
| 6,380,269 B1 | 4/2002 | Benko et al. | |
| 6,416,705 B1 | 7/2002 | Dinzburg et al. | |
| 6,479,558 B1 | 11/2002 | Fliermans | |
| 6,541,526 B1 | 4/2003 | Goldshtein et al. | |
| 6,590,042 B1 | 7/2003 | Tang | |
| 6,831,109 B1 | 12/2004 | Beirakh et al. | |
| 6,872,754 B1 | 3/2005 | Wortham | |
| 6,924,319 B1 | 8/2005 | Alsdorf et al. | |
| 6,992,116 B2 | 1/2006 | Benko et al. | |

FOREIGN PATENT DOCUMENTS

| | | |
|---|---|---|
| CN | 1072937 A | 6/1993 |
| CN | 1145295 A | 3/1997 |
| GB | 20558 | 0/1913 |
| GB | 159987 | 3/1921 |

OTHER PUBLICATIONS

Supplementary European Search Report issued in EP Application No. 07755210.7, dated Aug. 18, 2011, 6 pages.
English language translation of First Office Action issued in Chinese Application No. 200780045579.1, issued May 6, 2011 (9 pages).
Kawaguchi Tadayoshi, "Reasonable Manufacturing Method of Reclaimed Rubber", The Society of Rubber Industry, Japan 1949, vol. 22, No. 6, pp. 123-128 (http://www.journalarchive.jst.go.jp/jnlpdf.php?cdjournal=jomu1994&cdvol+22&nois sue=6 &startpage=123&chr=ja).
Ullmann's Encyclopedia of Industrial Chemistry, Sixth, Completely Revised Edition, vol. 37, p. 565 (2003).

*Primary Examiner* — Edward Cain
(74) *Attorney, Agent, or Firm* — Rothwell, Figg, Ernst & Manbeck, P.C.

(57) ABSTRACT

Vulcanized rubber is devulcanized by contacting the vulcanized rubber with a terpentine liquid in a reaction mixture in the absence of an alkali metal.

22 Claims, No Drawings

DEVULCANIZED RUBBER AND METHODS

CROSS REFERENCE TO THE RELATED APPLICATION(S)

This application is a Divisional of Ser. No. 11/636,611, filed Dec. 11, 2006, now U.S. Pat. No. 7,767,722, the disclosure of which is incorporated herein in its entirety by reference.

The present disclosure relates generally to compositions and processes for the devulcanization of rubber.

BACKGROUND OF THE INVENTION

Field of the Invention

The recycling of used or discarded tires and other rubber products, which are almost always cured or vulcanized, by devulcanization has proven to be an extremely challenging problem. This problem can be attributed to the fact that vulcanization cross-links polymers in the rubber or elastomer with sulfur. The resultant cross-linked rubber or elastomer is thermoset, thus preventing it from being melted or reformed into other products like thermoplastic polymers or metals.

An increasingly dire need exists to recover the used or discarded tires and other rubber products in uncured, or devulcanized, form: The fossil fuels, e.g., petroleum, natural gas and coal, are the feedstocks for manufacturing various kinds of synthetic rubber and elastomer. They are also energy sources for producing and transporting natural rubber.

A variety of devulcanization processes have been invented to recover or reclaim rubber from the used or discarded tires and other rubber products comprising cured, or vulcanized, rubber or elastomer. The recovered rubber can be co-cured or co-vulcanized with virgin rubber to manufacture new tires and other rubber products if a large-scale devulcanization process can be carried out without degradation of the rubber at a relatively low cost. Nevertheless, no devulcanization process has proven to be commercially viable on a large scale heretofore. This is due to the fact that every devulcanization process invented to date is excessively expensive to construct and operate; moreover, every process is exceedingly difficult to scale up and control, and/or cumbersome to recover and purify the high-quality devulcanized rubber with minimum degradation because of one or more of the following reasons: (1) operating at an inordinately elevated pressure; (2) operating at a very high temperature; (3) being subjected to extremely large shear forces; (4) needing to use expensive vessels and mechanical devices, e.g., extruders and high-speed rollers; (5) requiring to supply a special form of energy, e.g., ultrasonic and microwave radiation; (6) being subjected to a mixture, or composition, of two or more reagents, catalysts and/or promoters, which are frequently highly toxic; (7) requiring an unusually long time even for partial devulcanization of cured rubber or elastomer; and (8) only capable of devulcanizing the surface of reclaimed rubber crumb. Typical or well-known devulcanization processes invented to date, all of which suffer from one or more of these 8 major deficiencies, are outlined in the following.

U.S. Pat. No. 4,104,205 discloses a process to devulcanize sulfur-cured elastomer containing polar groups. This process applies a controlled dose of microwave energy of between 915 MHz and 2450 MHz and between 41 and 177 watt-hours per pound, which is sufficient to break substantially all carbon-sulfur and sulfur-sulfur bonds but insufficient to break appreciable amounts of carbon-carbon bonds.

U.S. Pat. No. 5,284,625 discloses a process that continuously applies ultrasonic radiation to a vulcanized elastomer or rubber to break the carbon-sulfur, sulfur-sulfur and, if desired, the carbon-carbon bonds in a vulcanized elastomer. Through the application of certain levels of ultrasonic amplitudes in the presence of pressure and heat optionally, it is reported that cured, i.e., vulcanized elastomer or rubber, can be broken down. By means of this process, the rubber becomes soft, thereby enabling it to be reprocessed and reshaped in a manner similar to that with previously uncured rubber or elastomer.

U.S. Pat. No. 5,602,186 discloses a process for devulcanizing cured rubber by desulfurization. The process comprises steps of: (1) contacting rubber vulcanizate crumb with a solvent and an alkali metal to form a reaction mixture; (2) heating the reaction mixture in the absence of oxygen and with mixing to a temperature sufficient to cause the alkali metal to react with sulfur in the rubber vulcanizate; and (3) maintaining the temperature below which thermal cracking of the rubber occurs, thereby devulcanizing the rubber vulcanizate. The said patent indicates that it is preferable to control the temperature below about 300° C., or where thermal cracking of the rubber is initiated.

U.S. Pat. No. 5,891,926 discloses a process for devulcanizing cured rubber into devulcanized rubber that can be recompounded and recured into useful rubber products, and for recovering the devulcanized rubber from the cured rubber. The said process comprises the steps of: (1) heating the cured rubber to a temperature within the range of about 150° C. to about 300° C. under a pressure of at least about $3.4 \times 10^6$ Pascals (34.0 atm) in 2-butanol to devulcanize the cured rubber into the devulcanized rubber to produce a mixture of solid cured rubber, solid devulcanized rubber and a solution of the devulcanized rubber in the 2-butanol; (2) removing the solution of the devulcanized rubber from the solid cured rubber and the solid devulcanized rubber; (3) cooling the solution of the devulcanized rubber in the 2-butanol to a temperature of less than about 100° C.; and (4) separating the devulcanized rubber from the 2-butanol.

U.S. Pat. No. 6,380,269 discloses a process for devulcanizing the surface of reclaimed rubber crumb into surface devulcanized reclaimed rubber crumb that is suitable for recompounding and recuring into high performance rubber products. The said process comprises the steps of: (1) heating the reclaimed rubber crumb to a temperature within the range of about 150° C. to about 300° C. under a pressure of at least about $3.4 \times 10^6$ Pascals (34.0 atm) in the presence of 2-butanol to devulcanize the surface of the rubber crumb thereby producing a slurry of the surface devulcanized reclaimed rubber crumb in the 2-butanol, wherein the reclaimed rubber crumb has a particle size within the range of about 325 mesh to about 20 mesh; and (2) separating the surface devulcanized reclaimed rubber crumb from the 2-butanol.

U.S. Pat. No. 6,416,705 discloses a process and apparatus for devulcanizing cured, or cross-linked, elastomer or various kinds of rubber by the steps of: (1) subdividing them into small particle form; (2) confining the particles of elastomer under high force, as in a screw extruder or the like; and (3) imparting ultrasonic energy to the particles remaining confined to effect devulcanization. Energy is fed to the confined particles transversely of the axis along which they are advancing, and energy from a source is reflected off a portion of the apparatus and back into the treatment zone so as to achieve maximum energy utilization. In particular instances, reflection of energy is achieved by providing opposed, powered ultrasonic horns that resonate in phase with each other. In another embodiment, oppositely directed, resonantly tuned horns are used, with less than all such horns being powered and the remainder being passive or unpowered reflecting horns whose resonant frequency is tuned to that of the powered horn. In one apparatus, the pairs of horns resonate in phase by reason of delay lines interposed between the two power sources. In the other form, the mass of the passive horn is balanced with that of the active horn to achieve in-phase tuning that maximizes reflection of energy.

U.S. Pat. No. 6,479,558 discloses a process and resulting product in which a vulcanized solid particulate, such as vulcanized crumb rubber, has select chemical bonds broken by biotreatment with thermophillic microorganisms selected from naturally occurring isolates derived from hot sulfur springs. The biotreatment of the crumb rubber renders the treated crumb rubber more suitable for use in new rubber formulations. As a result, larger loading levels and sizes of the treated crumb rubber can be used in new rubber mixtures.

U.S. Pat. No. 6,541,526 discloses a mechanical/chemical process and composition for devulcanizing cured rubber that maintains the macromolecules and renders sulfur passive for later re-vulcanization. The said process comprises the steps of: (1) shredding and crushing used rubber; (2) removing metal pieces from shredded and crushed rubber; and (3) adding a modifying composition as the particles of shredded waste rubber are poured between two rollers that further crush the particles. The modifying composition is a mixture of a proton donor that selectively breaks the sulfur bonds and renders the sulfur passive; a metal oxide; an organic acid that builds new bonds between macromolecules for later re-vulcanization; an inhibitor that prevents re-attachment of sulfur radicals with each other before the proton donor attaches itself to the sulfur; and a friction agent that prevents sliding of the waste rubber between the rollers. The particles are subjected to at least ten sets of rollers.

U.S. Pat. No. 6,590,042 discloses a process for reclaiming sulfur-cured, i.e., vulcanized, rubber, by the steps of: (1) combining finely ground scrap vulcanized rubber within a specialized, twin-screw extruder capable of providing strong shearing and just-on-time mixing; (2) adding a reclaiming agent to the extruder; and (3) masticating the rubber scrap and reclaiming agent within the extruder until the rubber scrap is devulcanized. The said patent also discloses a unique composition of reclaiming agent, which preferably includes the following compounds: accelerators, TBBS, ZMBT, MBT, and TMTM; activators, zinc oxide and stearic acid; and zinc salts of fatty acids and sulfur. The reclaimed rubber is suitable for producing high-grade, rubber products without adding a binder, or for combining with fresh rubber compounds to produce high-specification rubber products.

U.S. Pat. No. 6,831,109 discloses a process that provides a modifier for devulcanization of cured elastomer, and especially vulcanized rubber. The said modifier contains a first chemical substance, which is disposed towards on and the formation of an organic cation and amine, and further contains a second chemical substance as promoter of dissociation of the first chemical substance. The said promoter contains a functional group constituting an acceptor of said amine.

U.S. Pat. No. 6,924,319 discloses a process for devulcanizing comminuted scrap rubber of rubber granules, the sulfur bridges on which are broken and activated for revulcanization. The said process comprises the steps of: (1) treating the rubber granules to swell the rubber structure of the granule surface; and (2) mixing the treated rubber granules with a devulcanization formulation, acting mechanically and chemically reductively on the rubber granules, in a heating and cooling mixer combination. The rubber granules and the devulcanization formulation are heated to a temperature of 105-150° C. and subsequently cooled immediately. A devulcanization compound is prepared by mixing the devulcanization product with vulcanization and binding agents so as to coat the rubber granules uniformly with them. The devulcanization compound can also be prepared by coating the swelled rubber granules in layers by admixing vulcanization agents such as accelerators, activators, auxiliary agents, binding agents, oxygen radical donors, and scavengers.

U.S. Pat. No. 6,992,116 discloses a process whose invention is based upon the unexpected discovery that the surface of reclaimed rubber crumb particles can be devulcanized by heating the crumb particles to a temperature of at least about 150° C. under a pressure of at least about $3.4 \times 10^6$ Pascals (34.0 atm) in the presence of 2-butanol. It is further based upon the unexpected discovery that such surface devulcanized rubber crumb particles having a particle size within the range of about 325 mesh to about 20 mesh can be recompounded and recured into high performance rubber products, such as tires, hoses and power transmission belts. This patent more specifically discloses a process for devulcanizing the surface of reclaimed rubber crumb into surface devulcanized reclaimed rubber crumb that is suitable for recompounding and recuring into high performance rubber products. The said process comprises the steps of: (1) heating the reclaimed rubber crumb to a temperature within the range of about 150° C. to about 300° C. under a pressure of at least about $3.4 \times 10^6$ Pascals (34.0 atm) in the presence of 2-butanol to devulcanize the surface of the rubber crumb thereby producing a slurry of the surface devulcanized reclaimed rubber crumb in the 2-butanol, wherein the reclaimed rubber crumb has a particle size within the range of about 325 mesh to about 20 mesh; and (2) separating the surface devulcanized reclaimed rubber crumb from the 2-butanol.

SUMMARY OF INVENTION

An aspect of the present invention provides a method of devulcanizing rubber wherein a portion of vulcanized rubber is contacted with a turpentine liquid in a reaction mixture in an absence of an alkali metal.

According to an aspect of the invention, the turpentine liquid is any one or more liquids selected from the group consisting of: natural turpentine, synthetic turpentine, pine oil, α-pinene, β-pinene, α-terpineol, β-terpineol, 3-carene, anethole, dipentene (p-mentha-1,8-diene), terpene resins, nopol, pinane, camphene, p-cymene, anisaldehyde, 2-pinane hydroperoxide, 3,7-dimethyl-1,6-octadiene, isobornyl acetate, terpin hydrate, ocimene, 2-pinanol, dihydromyrcenol, isoborneol, α-terpineol, alloocimene, alloocimene alcohols, geraniol, 2-methoxy-2,6-dimethyl-7,8-epoxyoctane, camphor, p-menthan-8-ol, α-terpinyl acetate, citral, citronellol, 7-methoxydihydrocitronellal, 10-camphorsulphonic acid, p-menthene, p-menthan-8-yl acetate, citronellal, 7-hydroxydihydrocitronellal, menthol, menthone, polymers thereof, and mixtures thereof.

According to a preferred aspect of the invention, the turpentine liquid is any one or more liquids selected from the group consisting of, natural turpentine, synthetic turpentine, pine oil, α-pinene, β-pinene, γ-terpineol, β-terpineol, polymers thereof, and mixtures thereof.

According to an aspect of the invention, the vulcanized rubber may be provided in any size that facilitates contact with a turpentine liquid. The rubber may be provided as chunks, one or more pieces, or blocks, for example, large fragments or pieces of an automobile or truck tire. The rubber may comprise an intact device or article such as an intact tire or sheet. According to a preferred aspect of the invention, the vulcanized rubber is provided as a vulcanized rubber crumb. According to a preferred aspect of the invention, the rubber crumb has an average particle size of from about 0.074 millimeters to about 50 millimeters.

According to an aspect of the invention, the turpentine liquid further comprises a solvent. According to a preferred aspect of the invention, the solvent is selected from the group consisting of lower aliphatic alcohols, lower alkanes, and mixtures thereof. According to a preferred aspect, the solvent is selected from the group consisting of ethanol, propanol, butanol, heptane, and mixtures thereof.

According to an aspect of the invention, the rubber and the turpentine liquid are contacted at a temperature of from about 10° C. to about 180° C. Preferably, the rubber is contacted by the turpentine liquid at a temperature of less than 180° C. More preferably, the rubber is contacted by the turpentine liquid at a temperature of less than 100° C.

According to a further aspect of the invention, the rubber and the turpentine liquid are contacted at a pressure of from about $4 \times 10^4$ Pascal to about $4 \times 10^5$ Pascal. According to an aspect, the method is executed at a pressure of from about 0.4 atmosphere to about 4 atmospheres.

According to an aspect of the invention, the method further comprises providing a reactor vessel within which the vulcanized rubber is contacted with the turpentine liquid. According to an aspect, agitation means are provided whereby the vulcanized rubber and the turpentine liquid contained within the reactor vessel are mixed and agitated.

According to an aspect the vulcanized rubber and turpentine liquid are incubated in a holding tank so as to prolong their time of contact. According to a further aspect, the degree of vulcanization is controlled by the length of time the rubber is in contact with the turpentine liquid and/or the temperature of the mixture of rubber and turpentine liquid.

According to an aspect, the vulcanized rubber is contacted with a heterogeneous liquid comprising a turpentine liquid and water.

According to an aspect, the vulcanized rubber is contacted by the turpentine liquid in the presence of an energy input selected from the group consisting of thermal energy in excess of about 250° C., pressure in excess of 4 atmospheres, microwave energy, ultrasonic energy, mechanical shear-forces, and mixtures thereof.

According to an aspect, a devulcanization catalyst is provided to the mixture of rubber and turpentine liquid.

According to an aspect, the reaction mixture is supplemented by the addition of a compound selected from the group consisting of carbon dioxide, metal oxides, sulfur-radical inhibitors, TBBS, ZMBT, MBT, TMTM, and mixtures thereof.

According to an aspect, a thermophilic microorganism is included in the reaction mixture.

Still other aspects and advantages of the present invention will become readily apparent by those skilled in the art from the following detailed description, wherein it is shown and described preferred embodiments of the invention, simply by way of illustration of the best mode contemplated of carrying out the invention. As will be realized the invention is capable of other and different embodiments, and its several details are capable of modifications in various obvious respects, without departing from the invention. Accordingly, the description is to be regarded as illustrative in nature and not as restrictive.

DETAILED DESCRIPTION OF A PREFERRED EMBODIMENT

Non-limiting, representative known turpentines which may be suitable for use in accordance with the present invention are disclosed in Ullmann's Encyclopedia of Industrial Chemistry, Sixth, Completely Revised Edition, Volume 37, page 565 (2003), and may include natural turpentine, synthetic turpentine, pine oil, α-pinene, β-pinene, α-terpineol, β-terpineol, 3-carene, anethole, dipentene (p-mentha-1,8-diene), terpene resins, nopol, pinane, camphene, p-cymene, anisaldehyde, 2-pinane hydroperoxide, 3,7-dimethyl-1,6-octadiene, isobornyl acetate, terpin hydrate, ocimene, 2-pinanol, dihydromyrcenol, isoborneol, α-terpineol, alloocimene, alloocimene alcohols, geraniol, 2-methoxy-2,6-dimethyl-7,8-epoxyoctane, camphor, p-menthan-8-ol, α-terpinyl acetate, citral, citronellol, 7-methoxydihydrocitronellal, 10-camphorsulphonic acid, p-menthene, p-menthan-8-yl acetate, citronellal, 7-hydroxydihydrocitronellal, menthol, menthone, polymers thereof, and mixtures thereof.

In preferred embodiments of the invention, a devulcanization reagent of choice is α-Terpineol, natural Turpentine, synthetic Turpentine, or pine oil, the last three of which are rich in α-Terpineol. The most preferred devulcanization reagent is α-Terpineol.

It is preferred that the devulcanization of cured (vulcanized) rubber or elastomer is to be carried out at a temperature within the range of about 10° C. to about 180° C. The most preferred devulcanization temperatures are within the range of about 60° C. to about 140° C. The pressure under which the devulcanization is to be carried out will typically be within the range of about $4.0 \times 10^4$ Pascals (0.4 atm or 5.9 lbs/in$^2$) to about $4.0 \times 10^5$ Pascals (4.0 atm or 74 lbs/in$^2$). It is generally most preferred to carry out the process under a pressure which is within the range of about $8.0 \times 10^4$ Pascals (0.8 atm or 2 lbs/in$^2$) to about $2.0 \times 10^5$ Pascals (2.0 atm or 30 lbs/in$^2$). It is normally preferred for the cured, or vulcanized, rubber or elastomer being devulcanized to be immersed in one or more of the said devulcanized reagents in the form of a bed of particles or pieces of cured rubber or elastomer whose sizes are within the range of about 0.074 mm (200 mesh) to about 50 mm in a vessel (reactor) that contains one or more of the said devulcanization reagents; it is most preferred that the sizes of crumb particles or pieces of cured (vulcanized) rubber or elastomer be within the range of about 0.297 mm (50 mesh) to about 10 mm. It is normally preferred that the bed of crumb particles or pieces of cured (vulcanized) rubber or elastomer be agitated by passing the devulcanization reagent or reagents in the form of liquid through the bed of crumb particles or by boiling the reagent or reagents. It is preferred that the duration of devulcanization be within about 1 minute to about 60 minutes. The cured (vulcanized) rubber or elastomer is partially or fully devulcanized; the extent of devulcanization can be effected by controlling the devulcanization conditions, such as temperature and pressure, and duration of devulcanization and/or adjusting the type, relative amount and concentration of an individual devulcanization reagent in the devulcanization vessel (reactor).

The most effective devulcanization reagent available up to these days for cured (vulcanized) rubber or elastomer has been claimed to be 2-butanol. Nevertheless, it is well known that a large quantity of 2-butanol is needed to commercially devulcanize cured (vulcanized) rubber or elastomer on the large-scale basis. A recently invented devulcanization process, which attempts to reduce the required amount of 2-butanol, is described in U.S. Pat. No. 6,992,116. In this invention, the reduction in the requirement of 2-butanol of 50% or more has been achieved by supplementing 2-butanol with an additional reagent, carbon dioxide, and maintaining the vulcanization temperature within the range of about 150° C. to about 300° C. under a pressure of at least about $3.4 \times 10^6$ Pascals (34.0 atm).

The basis of the present invention is the totally unexpected discovery that a family of devulcanization reagents, comprising natural and/or synthetic Terpineols, Pinenes, and Turpentines containing Terpineols, Pinenes and/or their polymers, are inordinately effective in devulcanizing cured (vulcanized) rubber or elastomer. These reagents are "green," i.e., low in toxicity, and relatively inexpensive, compared to all other known devulcanization reagents, including 2-butanol and/or their polymers, and various solutions or mixtures of these reagents with other compounds. It has been found that any of the said devulcanization reagents penetrates or diffuses into the particles or pieces of cured (vulcanized) rubber or elastomer at an appreciable rate, thus causing the particles or pieces to swell and remain swelled appreciably and permanently even under the far milder conditions, e.g., atmospheric temperature and pressure, than those required by the recent inventions pertaining to the devulcanization of cured (devulcanized) rubber or elastomer. It was observed that a piece of discarded tire with sizes of about 30 mm×10 mm and about 60 mm×20 mm became tearable by pulling by hand, when it was heated at about 70° C. and under the pressures of slightly less than $1.01\times10^5$ Pascals (1.0 atm or 14.8 lbs/in$^2$) for about 4 hours in α-Terpineol, one of the newly discovered devulcanization reagents in the present invention. The pieces transformed into a paste-like mass when left in reagent α-Terpineol for about 2 weeks thereafter. When analyzed by an independently certified laboratory, the total sulfur contents of the product were found to be 0.03 wt %. All the above-mentioned observations and results collectively indicate that the pieces of reclaimed used tire, which was obviously sulfur cured or vulcanized, was essentially devulcanzied totally. It can be readily estimated or extrapolated that a piece or particle of cured (vulcanized) rubber or elastomer of any finite size, for instance, the rubber part of a typical passenger tire, whose dimensions are about 260 mm in width, about 660 mm in outer diameter and about 410 mm in inner diameter, can be devulcanized at least partially or even totally if it is stored with one or more of the said devulcanization reagents for the duration lasting about one week to 6 weeks at a moderate temperature between about 50 and 120° C. and under the pressure of about $1.01\times10^5$ Pascals (1.0 atm or 14.8 lbs/in$^2$). Moreover, under the same pressure but at a moderately high temperature, e.g., about 150° C., the crumb particles of reclaimed cured (vulcanized) rubber from used tires with sizes ranging about 100 mesh (0.15 mm) to about 10 mesh (2 mm) were essentially devulcanized totally within about 12 minutes. In fact, the density of the said crumb particles of cured (vulcanized) rubber reduced from about 1.05 to about 0.90. The value of 1.05 is close to the weight-average density of the rubber part of a typical passenger car tire, which comprises cured SBR, natural rubber, carbon black and inorganic fillers. At the uncured or devulcanized state, it is about 0.90. Moreover, it is also the known approximate densities of some types of synthetic rubber. It is worth pointing out that 150° C. is the lowest temperature ever reported by the recent comparative invention (U.S. Pat. No. 6,992,116) requiring the pressure of at least about $3.4\times10^6$ Pascals (34.0 atm). It is a known fact that a temperature exceeding about 300° C. will induce depolymerization, thus yielding devulcanized rubber of a low molecular weight, i.e., low quality. Obviously, under the mild conditions, any of the devulcanization reagents newly disclosed in the current invention will yield the devulcanized rubber, preserving essentially original microstructure of the rubber; this will allow for it to maintain a relatively high molecular weight. Hence, any of the devulcanization reagents of this invention primarily breaks sulfur-sulfur bonds and/or carbon-sulfur bonds rather than carbon-carbon bonds. The devulcanized, reclaimed rubber can accordingly be used in the same types of applications as was the original or virgin rubber.

By utilizing any of the devulcanization reagents and processes of this invention, cured (vulcanized) rubber or elastomer can be devulcanized with a simple technique without the need for high-pressures vessels (reactors), microwaves, ultrasonic waves, catalysts or an additional reagent, such as alkali metal or carbon dioxide.

The subject invention more specifically discloses a family of devulcanization reagents, including natural and/or synthetic Terpineols, Pinenes, Turpentines containing Terpineols, Pinenes and/or their polymers, and various homogenous solutions or heterogeneous mixtures of these compounds with other compounds. The subject invention also more specifically discloses a group of processes for devulcanizing cured (vulcanized) rubber or elastomer into fully devulcanized, partially devulcanized or surface-devulcanized rubber or elastomer that are capable of being recompounded and recured into useful rubber products with any of the said devulcanization reagents. The said processes comprise cooling or heating the cured (vulcanized) rubber or elastomer to a temperature which is within the range of about 5° C. to about 250° C. and under a pressure ranging at least about $1.01\times10^4$ Pascals (0.1 atm) to about $1.01\times10^6$ Pascals (10.0 atm).

EXAMPLES

Example 1

In this example, α-Terpineol was the devulcanization reagent for a rectangular piece of the cured (vulcanized) passenger tire. A typical passenger tire nominally contains about 35 wt. % of styrene butadiene rubber (SBR) and about 18 wt. % of natural rubber (NR); the remainder includes carbon black, fillers and sulfur. The size of the said rectangular piece of cured passenger tire was about 60 mm×20 mm. At the outset, the piece weighing about 38 grams and about 400 grams of the devulcanization reagent were charged into a container of about 58 mm in diameter and 250 ml in volume. The devulcanization operation (experiment) was carried out for about 240 minutes at the temperature of about 70° C. and under the pressure slightly less than $1.01\times10^5$ Pascals (1.0 atm or 14.7 lbs/in$^2$); this pressure was maintained in all the examples due to the altitude of the location where the devulcanization operations (experiments) were performed. The piece absorbed about 36% of the devulcanization reagent at the end of experiment and become tearable by pulling by hand, thereby signifying that the breaking of the bonds in sulfur cross-links was essentially complete.

Example 2

This example is essentially identical to Example 1 except that the size of a rectangular piece of cured (vulcanized) passenger tire devulcanized was about 30 mm×10 mm. At the outset, the piece weighing about 18 grams and about 400 grams of the said devulcanization reagent were charged into a container of about 58 mm in diameter and about 250 ml in volume. The devulcanization operation (experiment) was carried out at the temperature of about 70° C. and under the pressure of slightly less than $1.01\times10^5$ Pascals (1.0 atm or 14.7 lbs/in$^2$) for about 240 minutes. When left in the container together with the reagent at about 25° C. for 14 days, the piece transformed into a paste-like mass. Moreover, the total sulfur contents of the mass were analyzed by an independent certified laboratory to be about 0.03 wt. %. This indicated that the breaking of sulfur cross-links in the piece of cured (vulcanized) passenger tire was essentially complete: The sulfur contents of cured passenger tire are nominally about 1.24 wt. %.

Example 3

In this example, as Examples 1 and 2, α-Terpineol was the devulcanization reagent; however, the cured (vulcanized) passenger tire was in the form of crumb particles. As indicated in Examples 1 and 2, the passenger tire nominally contained about 35 wt. % of styrene butadiene rubber (SBR) and about 18 wt. % of natural rubber (NR); the remainder included carbon black, fillers and sulfur. The sizes of crumb particles ranged from about 100 mesh (0.15 mm) to about 10 mesh (2 mm). At the outset, about 5 grams of crumb particles and about 15 grams of the devulcanization reagent were charged into a test tube of about 16 mm in diameter and about 125 mm in length. These crumb particles formed a bed at the bottom of the test tube. A series of devulcanization operations (experiments) was carried out at the 5 temperatures of about 16, 45, 65, 96 and 150° C., all under the pressure of slightly less than $1.01 \times 10^5$ Pascals (1.0 atm or 14.7 lbs/in$^2$). The degree of bed expansion in terms of the ratio between bed height at any time increment and the original bed height was computed and recorded at each temperature. The bed-expansion ratios at the 4 time increments of about 30, 60, 120 and 240 minutes were: about 1.0, 1.05, 1.08 and 1.38, respectively, at 16° C.; about 1.0, 1.09, 1.20 and 1.47, respectively, at 45° C.; about 1.16, 1.35, 1.44 and 1.46, respectively, at 65° C.; and about 1.36, 1.60, 1.68 and 1.68, respectively, at 96° C. The bed-expansion ratios at the time increments of about 5, 12, 18, and 24 minutes were about 1.44, 1.88, 2.13 and 2.25, respectively, at 150° C. Note that the bed-height expansion ratio is initially 1 by definition.

At the temperatures of about 16, 45, 65 and 96° C., the degree of devulcanization was estimated from the pre-established relationship between the bed expansion ratio and density of cured (vulcanized) rubber being devulcanized from the measurements carried out at the 4 time increments of about 30, 60, 120 and 240 minutes as mentioned earlier. The degrees of conversion were: about 0, 15, 24 and 87 percent, respectively, at 16° C.; about 0, 23, 46 and 89 percent (%), respectively, at 45° C.; about 69, 94, 97 and 100 percent (%), respectively, at 65° C.; about 69, 94, 97 and 100 percent, respectively, at 96° C. At 150° C., the degrees of conversion were estimated at the 4 time increments of about 5, 12, 18, and 24 minutes, as also mentioned earlier; they were about 54, 83, 94 and 99 percent, respectively.

The results imply that the degree or extent of devulcanization of cured (vulcanized) rubber or elastomer with devulcanization reagent α-Terpineol can be readily varied by manipulating the temperature and duration of devulcanization operation. All the partially or fully devulcanized crumb particles of cured passenger tire remained expanded even at least two days after the treatment, hardly with any change in the expansion ratio. This observation indicated that the expansion of crumb particles was not due to simply the physical swelling caused by the penetration of devulcanization reagent α-Terpineol into the crumb particles; in other words, they were indeed devulcanized. The observation was further ascertained by the fact that the devulcanization reagent's color, which was originally totally transparent became increasing dark and opaque with the progress of treatment time; the higher the temperature, the greater the rate of color change. This was attributable to the issuing of the carbon black and fillers from the pores of crumb particles; the size and number of pores magnified with time as clearly revealed through microscopic observations.

Example 4

In this example, a mixture of α-Terpineol and n-butanol (1-butanol), forming a homogeneous solution, was the devulcanization reagent. The cured (vulcanized) passenger tire, which was eventually devulcanized, was in the form of crumb particles, as in Example 3. At the outset, about 5 grams of crumb particles and about 15 grams of the devulcanization reagent, a homogenous solution, comprising α-Terpineol and 1-butanol, were charged into a test tube of about 16 mm in diameter and about 125 mm in length. These crumb particles formed a bed at the bottom of the test tube. A series of devulcanization operations was carried out at about 65° C. and under the pressure of slightly less than $1.01 \times 10^5$ Pascals (1.0 atm or 14.7 lbs/in$^2$); with the said devulcanization reagent (solution) by varying its concentration levels as about 20, 40, 60, 80 and 100 weight percent (wt. %) of 1-butanol (or equivalently, about 80, 60, 40, 20 and 0 wt. % of α-Terpineol), all under the pressure of about $1.01 \times 10^5$ Pascals (1.0 atm. or 14.7 lbs/in$^2$). The degree of bed expansion in terms of the ratio between bed height at any time increment and the original bed height was computed and recorded. The bed-expansion ratios at the 5 time increments of about 20, 40, 60, 80 and 120 minutes were: about 1.36, 1.40, 1.42, 1.42 and 1.42, respectively, at 20 wt. %; about 1.31, 1.37, 1.39, 1.39 and 1.39, respectively, at 40 wt. %; about 1.20, 1.24, 1.24, 1.24 and 1.24, respectively, at 60 wt. %; about 1.15, 1.17, 1.17, 1.17 and 1.17, respectively, at 80 wt. %; and about 1.16, 1.16, 1.16, 1.16 and 1.16, respectively, at 100 wt. %, which signify pure 1-butanol. Note that the bed-height expansion ratio is initially 1 by definition.

The degree of devulcanization was estimated from the pre-established relationship between the bed expansion ratio and density of cured (vulcanized) rubber being devulcanized from the measurements carried out at the 5 time increments of about 20, 40, 60, 80 and 120 minutes, as mentioned earlier. The degrees of devulcanization were: about 85, 94, 94, 94, and 94 percent (%), respectively, at 20 wt. %; about 76, 87, 91, 91 and 91 percent (%), respectively, at 40 wt. %; and about 54, 62, 62, 62 and 62 percent (%), respectively, at 60 wt. %. The slight bed expansion observed, when the concentration of 1-butanol exceeded about 60 wt. %, can be largely attributed to the well-known physical swelling of cured (vulcanized) rubber induced by the penetration of an organic solvent of a relatively small molecule size, e.g., butanol, propanol and hexane.

The results imply that the cured (vulcanized) rubber or elastomer can be readily devulcanized to different degrees with the said devulcanization reagent, homogeneous solution comprising α-Terpineol and 1-butanol, by varying the reagent's concentration and duration of devulcanization operation. The partially or nearly fully devulcanized crumb particles of cured (vulcanized) passenger tire remained expanded even at least two days after the treatment, as long as the concentration of 1-butanol was less than about 80 wt. % (or equivalently, the concentration of α-Terpineol was greater than about 20 wt. %) without a noticeable change in the expansion ratio. This observation indicates that the expansion of crumb particles was not due to simply the physical swelling caused by the penetration of the said devulcanization reagent into the crumb particles; in other words, they were indeed devulcanized. The observation was further ascertained by the fact that the devulcanization reagent's color, which was originally transparent, became increasing dark and opaque with the progress of devulcanization. This was attributable to the issuing of the carbon black and fillers from the pores of crumb particles.

The resultant data show that as long as the said devulcanization reagent contains less than about 60 wt. % of 1-butanol, the higher the concentration of 1-butanol, the slower the rate of devulcanization and possibly the lower the maximum attainable degree or extent of devulcanization. Nevertheless, this is not necessarily disadvantageous especially when only the surface or partial devulcanization is to be achieved. The addition of 1-butanol to α-Terpineol would ease the regulation of the degree of devulcanization through the reduction in the rate of devulcanization; enhance the possibility of minimizing the consumption and/or cost of the devulcanization reagent; alter the physical properties of the devulcanization reagent so as to facilitate devulcanization.

Example 5

This example is similar to Example 4; however, a homogeneous solution of α-Terpineol and propanol, instead of a homogeneous solution of α-Terpineol and 1-butanol, was the devulcanization reagent. The cured (vulcanized) passenger tire, which was eventually devulcanized, was in the form of crumb particles, as in Examples 3 and 4. A series of devulcanization operations was carried out at about 65° C. and under the pressure of slightly less than $1.01 \times 10^5$ Pascals (1.0 atm or 14.7 lbs/in$^2$) with the said devulcanization reagent (solution) by varying its concentration levels as about 20, 30 and 40 weight percent (wt. %) of propanol (or equivalently, about 80, 70 and 60 wt. % of α-Terpineol). The degree of bed expansion in terms of the ratio between bed height at any time increment and the original bed height was computed and recorded. The bed-expansion ratios at the 4 time increments of about 20, 60, 100 and 800 minutes were: about 1.08, 1.24, 1.29 and 1.42, respectively, at 20 wt. %; about 1.09, 1.17, 1.26 and 1.34, respectively, at 30 wt. %; and about 1.02, 1.07, 1.13 and 1.15, respectively, at about 40 wt. %.

The degree of devulcanization was estimated from the pre-established relationship between the bed expansion ratio and density of cured (vulcanized) rubber being devulcanized from the measurements carried out at the 4 time increments of about 20, 60, 100 and 800 minutes, as mentioned earlier. The degree of devulcanization was about 24, 62, 72 and 94 percent (%), respectively, at 20 wt. %; about 26, 46, 66 and 81 percent (%), respectively, at 30 wt. %; and about 6, 21, 37 and 42 percents (%), respectively, at 40 wt. %. The relatively slight bed expansion observed, when the concentration of propanol exceeded about 40%, can be largely attributed to the well-known physical swelling of cured (vulcanized) rubber.

The resultant data show that as long as the said devulcanization reagent contains less than 40 wt. % of propanol, the higher the concentration of propanol, the slower the rate of devulcanization and possibly the lower the maximum attainable degree or extent of devulcanization. The comparison of the data in this example with those of Example 4 indicates that the effects of the inert constituent in the devulcanization reagent, which is a homogenous solution, 1-butanol in Example 4 and propanol in this example, on the rate and degree of devulcanization are qualitatively similar but substantially different quantitatively. This offers an additional degree of freedom to optimize the devulcanization operation to suit its intent, which can be surface, partial or full devulcanization, the tire type, the size and shape of the cured (vulcanized) rubber or elastomer to be devulcanized, and the prevailing prices of the constituents in the devulcanization reagent. Moreover, it is entirely plausible that two or more soluble constituents can be included in the devulcanization reagent in the form of a homogeneous solution.

Example 6

In this example, a homogeneous solution of α-Terpineol and iso-propanol served as the devulcanization reagent. The cured (vulcanized) passenger tire, which was eventually devulcanized, was in the form of crumb particles, as in Examples 4 and 5. A series of devulcanization operations was carried out at about 65° C. and under the pressure of slightly less than $1.01 \times 10^5$ Pascals (1.0 atm or 14.7 lbs/in$^2$) with the said devulcanization reagent (solution) by varying its concentration levels as about 20, 30 and 40 weight percent (wt. %) of iso-propanol (or equivalently, about 80, 70, and 60 wt. % of α-Terpineol). The bed-expansion ratios at the 4 time increments of about 20, 60, 100 and 800 minutes were: about 1.04, 1.15, 1.17 and 1.17, respectively, at 20 wt. %; about 1.06, 1.16, 1.16 and 1.16, respectively, at 30 wt. %; and about 1.06, 1.18, 1.18 and 1.18, respectively, at 40 wt. %.

The extent of devulcanization was again estimated from the pre-established relationship between the bed expansion ratio and density of cured (vulcanized) rubber being devulcanized from the measurements carried out at the 4 time increments of about 20, 60, 100 and 800 minutes, as mentioned earlier. The degree of devulcanization was about 12, 42, 46 and 46 percent (%), respectively, at 20 wt. %; about 18, 44, 44 and 44 percent (%), respectively, at 30 wt. %; and about 18, 48, 48 and 48 percent (%), respectively, at 40 wt. %.

The resultant data show that when the concentration of iso-propanol in the devulcanization reagent was between about 20 wt. % and about 40 wt. %, the rate of devulcanization and the maximum attainable degree or extent of devulcanization exhibited relatively little variations. This differs substantially from the trend of the data obtained in Examples 4 and 5.

Example 7

This example is similar to Example 4; a homogeneous solution of α-Terpineol and heptane, instead of a homogeneous solution of α-Terpineol and iso-propanol, was the devulcanization reagent. A series of devulcanization operations was carried out at about 65° C. and under the pressure of slightly less than $1.01 \times 10^5$ Pascals (1.0 atm or 14.7 lbs/in$^2$) with the devulcanization reagent (solution) by varying its concentration levels as about 20, 30 and 40 weight percent (wt. %) of heptane (or equivalently, about 80, 70 and 60 wt. % of α-Terpineol). The bed-expansion ratios at the 4 time increments of about 20, 60, 100 and 800 minutes were: about 1.17, 1.28, 1.28 and 1.28, respectively, at 10 wt. %; about 1.08, 1.23, 1.29 and 1.29, respectively, at 20 wt. %; about 1.13, 1.19, 1.25 and 1.25, respectively, at 30 wt. %; and about 1.15, 1.18, 1.24 and 1.24, respectively, at 40 wt. %.

The extent of devulcanization was estimated from the pre-established relationship between the bed expansion ratio and density of cured (vulcanized) rubber being devulcanized from the measurements carried out at the 4 time increments of about 20, 60, 100 and 800 minutes, as mentioned earlier. The degree of devulcanization was: about 46, 71, 71 and 71 percent (%), respectively, at 10 wt. %; about 24, 60, 72 and 72 percent (%), respectively, at 20 wt. %; about 37, 48, 64 and 64 percent (%), respectively, at 30 wt. %; and about 42, 48, 62 and 62 percent (%), respectively, at 40 wt. %.

The resultant data also show that as long as the said devulcanization reagent contains less than about 40 wt. %, of heptane, the higher the concentration of heptane, the slightly slower the rate of devulcanization except at the early stage and possibly the lower the maximum attainable degree or extent of devulcanization.

The comparison of the data in this example with those of Examples 4 and 5 again indicates that the effects of the inert constituent in the devulcanization reagent on the rate and degree of devulcanization obtained in this example are somewhat qualitatively similar to but substantially different quantitatively from those in Examples 4 and 5.

Example 8

This example is nearly identical to Example 4 in every aspect except that a homogeneous solution of α-Terpineol and 2-butanol, instead of 1-butanol, served as the devulcanization reagent.

Apparently, 2-butanol has been regarded as one of the most, if not the most, effective devulcanization reagents in some of the patents, e.g., that outlined in segment [0014]. Nevertheless, severe conditions in terms of pressure and temperature and some ancillary reagents and/or catalysts are required for it to exhibit its effectiveness.

At the outset, about 5 grams of crumb particles and about 15 grams of the said devulcanization reagent, a homogenous solution comprising α-Terpineol and 2-butanol, were charged into a test tube of about 16 mm in diameter and about 125 mm in length. These crumb particles formed a bed at the bottom of the test tube. A series of devulcanization operations (experiments) was carried out at about 65° C. and under the pressure of slightly less than $1.01 \times 10^5$ Pascals (1.0 atm or 14.7 lbs/in$^2$). The bed-expansion ratios at the 5 time increments of about 20, 40, 60, 80 and 120 minutes were: about 1.24, 1.29, 1.34, 1.34 and 1.34, respectively, at 20 wt. %; about 1.24, 1.29, 1.33, 1.33 and 1.33, respectively, at 40 wt. %; and about 1.12, 1.23, 1.23, 1.23 and 1.23, respectively, at 60 wt. The corresponding degrees of devulcanization were: about 62, 72, 81, 81 and 81 percent (%), respectively, at 20 wt. %; about 62, 72, 79, 79 and 79 percent (%), respectively, at 40 wt. %; and about 46, 92, 94, 94 and 94 percent (%), respectively, at 60 wt. %. The slight bed expansion observed, when the concentration of 2-butanol exceeded about 60 wt. %, can be largely attributed to the well-known physical swelling of cured (vulcanized) rubber induced by the penetration of an organic solvent of a relatively small molecule size.

The comparison of the results of this example with those of Example 4 through 7, especially with those of Example 4, indicates the effectiveness of the solution comprising α-Terpineol and 2-butanol and that of the solution comprising α-Terpineol and 1-butanol for devulcanizing cured rubber are similar at any given concentration. Moreover, the extent of reduction in the effectiveness of α-Terpineol to devulcanize cured rubber is very roughly the same when diluted with 1-butanol, 2-butanol, propanol, iso-propanol, and heptane.

Example 9

This example is similar to Examples 4 through 8 in almost all aspects, including the crumb particles of cured (vulcanized) rubber devulcanized. The unique feature was that the inert constituent solvent in the devulcanization reagent was ethanol, which is one of the most common organic solvents available. Some devulcanization operations (experiments) were performed at about 65° C. and under the pressure of slightly less than $1.01 \times 10^5$ Pascals (1.0 atm or 14.7 lbs/in$^2$) to determine if the effects of adding ethanol would have been similar to those of adding any of other solvents used in Example 4 through 8, i.e., 1-butanol, propanol, iso-propanol, heptane and 2-butanol. The results indicated that it was indeed the case; when the concentration of ethanol in the devulcanization reagent was less than about 70 wt. %, the degrees of devulcanization attainable ranged from about 20 percent (%) at about 20 minutes of the devulcanization (treatment) time to about 50 percent (%) at about 100 minutes of the devulcanization (treatment) time.

Example 10

In this example, the devulcanization reagent was a heterogeneous mixture of α-Terpineol and water, instead of a homogeneous solution of α-Terpineol and an organic solvent. The cured (vulcanized) passenger tire, which was eventually devulcanized, was in the form of crumb particles, as in Examples 4 through 9. A series of devulcanization operations (experiments) was carried out at about 96° C. and under the pressure of slightly less than $1.01 \times 10^5$ Pascals (1.0 atm or 14.7 lbs/in$^2$) with the said devulcanization reagent (mixture) by varying its weight fractions in the mixture as about 20, 30 and 40 weight percent (wt. %) of water (or equivalently, about 80, 70 and 60 wt. % of α-Terpineol). The degree of bed expansion in terms of the ratio between bed height at any time increment and the original bed height was computed and recorded. The bed-expansion ratios at the 4 time increments of about 20, 40, 60 and 80 minutes were: about 1.35, 1.46, 1.46 and 1.46, respectively, at 20 wt. %; about 1.33, 1.49, 1.49 and 1.49, respectively, at 30 wt. %; and about 1.34, 1.47, 1.47 and 1.47, respectively, at about 40 wt. %. The corresponding degrees of devulcanization were: about 62, 75, 75 and 75 percent (%), respectively, at 20 wt. %; about 59, 79, 79 and 79 percent (%), respectively, at 30 wt. %; and about 61, 76, 76 and 76 percent (%), respectively, at 40 wt. %.

The resultant data showed that when the weight fractions of water in the devulcanization reagent, which was a heterogeneous mixture, were between about 20 wt. % and about 40 wt. %, the rate of devulcanization and the maximum attainable degree or extent of devulcanization exhibited relatively little variations. This differed substantially from the trend of the data obtained in Examples 4 and 5 and similar to that of Example 6. Nevertheless, the initial rates of devulcanization recorded in this example were much greater that those recorded in Example 6. The results can be attributed to the effects of vigorous mechanical agitation of the reagent and crumb particles by bubbles of boiling water.

Example 11

This example is similar to Example 3 in many aspects, including the crumb particles of cured (vulcanized) rubber devulcanized. The unique feature was that the devulcanization reagent was natural Turpentine instead of α-Terpineol; the former is widely available. The devulcanization operation (experiment) was carried out only at the one temperature level of about 96° C. instead of the 5 temperature levels. As in Example 3, the pressure was maintained at slightly less than, $1.01 \times 10^5$ Pascals (1.0 atm or 14.7 lbs/in$^2$). The degree of bed expansion in terms of the ratio between bed height at any time increment and the original bed height was computed and recorded. The bed-expansion ratios at the 4 time increments of about 20, 40, 60 and 80 minutes were about 1.29, 1.56, 1.60 and 1.62, respectively; the corresponding degree of conversion was about 54, 86, 90 and 91 percent (%), respectively.

The comparison of the resultant data with those from Example 3 indicates that natural Turpentine containing α-Terpineol is only slightly less effective than α-Terpineol for the devulcanization of cured rubber. It is worth noting that as revealed in Example 4 through 10, the effectiveness of α-Terpineol as the devulcanization reagent substantially exceeds that of any other reagents which are the solutions or mixtures containing α-Terpineol.

Example 12

This example is similar to Example 11. The unique feature was that the devulcanization reagent was synthetic Turpentine, which is also widely available, instead of natural Turpentine. Two devulcanization operations (experiments) were carried out at the two temperature levels of about 96 and 150° C. At both temperatures, the pressure remained at slightly less than $1.01 \times 10^5$ Pascals (1.0 atm or 14.7 lbs/in$^2$). The degree of bed expansion in terms of the ratio between bed height at any time increment and the original bed height was computed and recorded at each temperature. The bed-expansion ratios at the 4 time increments of about 20, 40, 60 and 80 minutes were about 1.46, 1.48, 1.48 and 1.48, respectively, at about 96° C. The corresponding degree of conversion was about 75, 78, 78 and 78 percent (%), respectively. The bed-expansion ratios at the 6 time increments of about 2, 5, 8, 11, 14 and 24 minutes were about 1.35, 1.60, 1.75, 1.95, 2.03 and 2.03, respectively, at about 150° C. The corresponding degrees of conversion were about 46, 67, 76, 87, 90 and 90 percent (%), respectively.

The comparison of the resultant data with those from Example 3 in which α-Terpineol was the reagent indicates that synthetic Turpentine, rich in α-Terpineol, is slightly less effective than α-Terpineol as the devulcanization reagent at about 96° C., but they are nearly equally effective at about 150° C. Moreover, the comparison of the data from this and preceding examples implies that synthetic Turpentine is slightly less effective than natural Turpentine as the devulcanziation reagent at about 96° C. It is, however, worth noting that natural Turpentine started boiling at about 150° C., and thus, the operation could not be continued under the aforementioned pressure.

Example 13

In this example, the crumb particles of cured (vulcanized) rubber were devulcanized by natural Turpentine and synthetic Turpentine side by side in parallel. The devulcanization operation (experiment) was carried out only at the temperature level of about 65° C. under the pressure of slightly less than $1.01 \times 10^5$ Pascals (1.0 atm or 14.7 lbs/in$^2$). The degree of bed expansion in terms of the ratio between bed height at any time increment and the original bed height was computed and recorded. The bed-expansion ratios at the 4 time increments of about 20, 40, 60 and 80 minutes were about 1.28, 1.37, 1.51 and 1.54, respectively, for natural Turpentine; and about 1.28, 1.38, 1.43 and 1.43, respectively, for synthetic Turpentine. The corresponding degrees of conversion were about 70, 86, 100 and 100 percent (%), respectively, for natural Turpentine; and about 70, 88, 96 and 96 percent (%), respectively, for synthetic Turpentine.

The comparison of the resultant data with those from Example 3 indicates that the effectiveness of α-Terpineol, natural Turpentine and synthetic Turpentine as the devulcanization agent is nearly the same at about 65° C.

Example 14

In this example, both synthetic Turpentine and α-Terpineol served as the devulcanization agents to devulcanize the crumb particles of cured (vulcanized) iso-perene rubber whose sizes ranged from 6 to 10 mesh. The devulcanization operation (experiment) was carried out only at the one temperature of about 96° C. The pressure was maintained at slightly less than $1.01 \times 10^5$ Pascals (1.0 atm or 14.7 lbs/in$^2$). The degree of bed expansion in terms of the ratio between bed height at any time increment and the original bed height was computed and recorded. The bed-expansion ratios at the 4 time increments of about 20, 40, 60 and 80 minutes were about 1.23, 1.32, 1.45 and 1.49, respectively, for synthetic Turpentine, and about 1.33, 1.42, 1.49 and 1.49, respectively, for α-Terpineol. The corresponding degrees of conversion were about 44, 58, 74 and 79 percent (%), respectively, for synthetic Turpentine, and about 59, 71, 79 and 79 percent (%), respectively, for α-Terpineol.

The comparison of the two sets of resultant data indicates that synthetic Turpentine, rich in α-Terpineol, is only slightly less effective than α-Terpineol for the devulcanization of cured iso-perene rubber, especially at the early stage at the temperature of about 96° C. The comparison of the results of this example with those of Example 3 reveals that cured iso-perene is less amenable to the devulcanization with α-Terpineol than cured passenger tire rich in SBR. It is worth noting that as revealed in Examples 4 through 10, the effectiveness of α-Terpineol as the devulcanization reagent substantially exceeds that of any other reagents, which are the solutions or mixtures containing α-Terpineol.

Example 15

In this example, both synthetic Turpentine and α-Terpineol served as the devulcanization agents to devulcanize the crumb particles of cured (vulcanized) SBR rubber whose sizes ranged from 6 to 10 mesh. The devulcanization operation (experiment) was carried out only at the one temperature of about 96° C. The pressure was maintained at slightly less than $1.01 \times 10^5$ Pascals (1.0 atm or 14.7 lbs/in$^2$). The degree of bed expansion in terms of the ratio between bed height at any time increment and the original bed height was computed and recorded. The bed-expansion ratios at the 4 time increments of about 20, 40, 60 and 80 minutes were about 1.46, 1.54, 1.54 and 1.54, respectively, for synthetic Turpentine, and about 1.60, 1.64, 1.64 and 1.64, respectively, for α-Terpineol. The corresponding degrees of conversion were about 75, 85, 85 and 85 percent (%), respectively, for synthetic Turpentine, and about 90, 93, 93 and 93 percent (%), respectively, for α-Terpineol.

The comparison of the two sets of resultant data indicates that synthetic Turpentine, rich in α-Terpineol, is only slightly less effective than α-Terpineol for the devulcanization of cured SBR rubber at the temperature of about 96° C. The comparison of the results of this example with those of Example 3 reveals that cured SBR is almost equally amenable to the devulcanization with α-Terpineol as cured passenger tire, rich in SBR.

It will, therefore, be appreciated by those skilled in the art having the benefit of this disclosure that this invention is capable of affording compositions and methods suitable for the devulcanization of rubber. Furthermore, it is to be understood that the form of the invention shown and described is to be taken as presently preferred embodiments. Various modifications and changes may be made to each and every processing step as would be obvious to a person skilled in the art having the benefit of this disclosure. It is intended that the following claims be interpreted to embrace all such modifications and changes and, accordingly, the specification and drawings are to be regarded in an illustrative rather than a restrictive sense. Moreover, it is intended that the appended claims be construed to include alternative embodiments.

The invention claimed is:

1. A system for devulcanizing rubber comprising a reactor vessel containing a vulcanized rubber having a sulfur content with sulfur cross-links is provided, and agitation means to mix the vulcanized rubber with a devulcanizing agent to form a reaction mixture, the devulcanizing agent being a turpentine liquid, wherein said turpentine liquid is present in the reaction mixture in an amount sufficient such that said turpentine liquid acts to substantially break said cross-links of said vulcanized rubber and wherein the action of said turpentine liquid results in substantial devulcanization of said vulcanized rubber.

2. The system of claim 1, wherein during the contacting, the sulfur cross-links broken by said devulcanizing agent is in an amount of at least about 54% of sulfur cross-links originally contained within said vulcanized rubber.

3. The system of claim 1, wherein during the contacting, the sulfur cross-links broken by said devulcanizing agent is in an amount of from about 75 to 100% of sulfur cross-links originally contained within said vulcanized rubber.

4. The system of claim 1, wherein, during the contacting, the sulfur content of the rubber is substantially reduced.

5. The system of claim 1, wherein said turpentine liquid is selected from the group consisting of:
natural turpentine, synthetic turpentine, pine oil, α-pinene, β-pinene, α-terpineol, β-terpineol, γ-terpineol, 3-carene, anethole, dipentene (p-mentha-1,8-diene), terpene resins, nopol, pinane, camphene, p-cymene, anisaldehyde, 2-pinane hydroperoxide, 3,7-dimethyl-1,6-octadiene, isobornyl acetate, terpin hydrate, ocimene, 2-pinanol, dihydromyrcenol, isoborneol, alloocimene, alloocimene alcohols, geraniol, 2-methoxy-2,6-dimethyl-7,8-epoxyoctane, camphor, p-menthan-8-ol, α-terpinyl acetate, citral, citronellol, 7-methoxydihydrocitronellal, 10-camphorsulphonic acid, p-menthene, p-menthan-8-yl acetate, citronellal, 7-hydroxydihydrocitronellal, menthol, menthone, polymers thereof, and mixtures thereof.

6. The system of claim 1, wherein said turpentine liquid is selected from the group consisting of, natural turpentine, synthetic turpentine, pine oil, α-pinene, β-pinene, α-terpineol, β-terpineol, polymers thereof, and mixtures thereof.

7. The system of claim 1, wherein said vulcanized rubber is provided in a form of at least one intact vulcanized rubber article, vulcanized rubber chunk, vulcanized rubber block, vulcanized rubber crumb, vulcanized rubber piece, or a plurality or mixture thereof.

8. The system of claim 1, wherein said rubber and said turpentine liquid are devulcanized at a temperature of from about 10° C. to about 180° C.

9. The system of claim 1, wherein said rubber and said turpentine liquid are contacted at a pressure of from about $4 \times 10^4$ Pascal (0.4 atm) to about $4 \times 10^5$ Pascal (4 atm).

10. The system of claim 1, in which said rubber and said turpentine liquid are agitated in said reactor vessel by bubbles of boiling water.

11. The system of claim 1, in which said vulcanized rubber is incubated with said turpentine liquid in a holding tank.

12. The system of claim 1, wherein said rubber is devulcanized by said turpentine liquid at a temperature of less than about 180° C.

13. A system for devulcanizing rubber comprising a reactor vessel containing a vulcanized rubber having a sulfur content with sulfur cross-links is provided, and agitation means to mix the vulcanized rubber with a devulcanizing agent to form a reaction mixture, the devulcanizing agent being a turpentine liquid, wherein said turpentine liquid is present in the reaction mixture in an amount sufficient such that said turpentine liquid acts to substantially break said cross-links of said vulcanized rubber and wherein the action of said turpentine liquid results in substantial devulcanization of said vulcanized rubber, wherein said rubber is devulcanized by said turpentine liquid at a temperature of less than 100° C.

14. The system of claim 1, further comprising providing an energy input selected from the group consisting of thermal energy in excess of about 250° C., pressure in excess of about $4 \times 10^5$ Pascals (4 atm), microwave energy, ultrasonic energy, mechanical shear-forces, and mixtures thereof, to facilitate devulcanization of the rubber.

15. A system for devulcanizing rubber comprising a reactor vessel containing a vulcanized rubber having a sulfur content with sulfur cross-links is provided, and agitation means to mix the vulcanized rubber with a devulcanizing agent to form a reaction mixture, the devulcanizing agent being a turpentine liquid, wherein said turpentine liquid is present in the reaction mixture in an amount sufficient such that said turpentine liquid acts to substantially break said cross-links of said vulcanized rubber and wherein the action of said turpentine liquid results in substantial devulcanization of said vulcanized rubber, wherein a devulcanization catalyst is provided to said reaction mixture during said contacting.

16. The system of claim 1, in which said reaction mixture is provided during the contacting with a compound selected from the group consisting of carbon dioxide, metal oxides, sulfur-radical inhibitors, N-tert-butyl-2-benzothiazole sulphenamide (TBBS), zinc mercaptobenzothiazole (ZMBT), 2-mercaptobenzothiazole (MBT), tetramethylthiuram monosulfide (TMTM), and mixtures thereof.

17. A system for devulcanizing rubber comprising a reactor vessel containing a vulcanized rubber having a sulfur content with sulfur cross-links is provided, and agitation means to mix the vulcanized rubber with a devulcanizing agent to form a reaction mixture, the devulcanizing agent being a turpentine liquid, wherein said turpentine liquid is present in the reaction mixture in an amount sufficient such that said turpentine liquid acts to substantially break said cross-links of said vulcanized rubber and wherein the action of said turpentine liquid results in substantial devulcanization of said vulcanized rubber, wherein said turpentine liquid has a weight greater than said vulcanized rubber in said reaction mixture.

18. The system of claim 1, wherein substantially all of the breaking of said cross-links and substantially all of said devulcanization results from activity of said turpentine liquid.

19. The system of claim 4, wherein substantially all of the breaking of said cross-links, substantially all of the reduction of said sulfur content and substantially all of said devulcanization results from activity of said turpentine liquid.

20. The system of claim 13, wherein said system further comprises means for adding a solvent to said rubber.

21. A system for devulcanizing rubber comprising a reactor vessel containing a vulcanized rubber having a sulfur content with sulfur cross-links is provided, and agitation means to mix the vulcanized rubber with a devulcanizing agent to form a reaction mixture, the devulcanizing agent being a combination of a turpentine liquid and a solvent selected from the group consisting of lower aliphatic alcohols, lower alkanes, and mixtures thereof, wherein said turpentine liquid is present in the reaction mixture in an amount sufficient such that said turpentine liquid acts to substantially break said cross-links of said vulcanized rubber and wherein the action of said turpentine liquid results in substantial devulcanization of said vulcanized rubber.

22. A system for devulcanizing rubber comprising a reactor vessel containing a vulcanized rubber having a sulfur content with sulfur cross-links is provided, and agitation means to mix the vulcanized rubber with a devulcanizing agent to form a reaction mixture, the devulcanizing agent being a turpentine liquid, wherein said turpentine liquid is present in the reaction mixture in an amount sufficient such that said turpentine liquid acts to substantially break said cross-links of said vulcanized rubber and wherein the action of said turpentine liquid results in substantial devulcanization of said vulcanized rubber, wherein said system operates so as to avoid boiling.

* * * * *